United States Patent
Adachi (10) Patent No.: US 8,967,546 B2
(45) Date of Patent: Mar. 3, 2015

(54) SPACE PROBING APPARATUS (75) Inventor: Tadashi Adachi, Tokyo (JP)

(73) Assignee: IHI Aerospace Co., Ltd, Tokyo (JP)

(*) Notice: Subject to any disclaimer, the term of this patent is extended or adjusted under 35 U.S.C. 154(b) by 496 days.

(21) Appl. No.: 13/125,590

(22) PCT Filed: Sep. 11, 2009

(86) PCT No.: PCT/JP2009/065944
§ 371 (c)(1),
(2), (4) Date: Jul. 5, 2011

(87) PCT Pub. No.: WO2010/050307
PCT Pub. Date: May 6, 2010

(65) Prior Publication Data
US 2011/0260007 A1    Oct. 27, 2011

(30) Foreign Application Priority Data

Oct. 30, 2008  (JP) ................................. 2008-279004
May 20, 2009  (JP) ................................. 2009-122011

(51) Int. Cl.
*B64G 1/58* (2006.01)
*B64G 1/16* (2006.01)
*B64G 1/50* (2006.01)

(52) U.S. Cl.
CPC ... *B64G 1/16* (2013.01); *B64G 1/50* (2013.01)
USPC .................................................... 244/171.8

(58) Field of Classification Search
USPC ............................ 244/171.7, 171.8; 296/39.3
See application file for complete search history.

(56) References Cited

U.S. PATENT DOCUMENTS 5,897,156 A      4/1999  Hayard et al.
2007/0063105 A1*  3/2007  Mann ......................... 244/171.8

FOREIGN PATENT DOCUMENTS

FR   2 738 548 A1    3/1997
JP   2001-106198 A   4/2001
JP   2001106198 A  *  4/2001

* cited by examiner

*Primary Examiner* — Brian M O'Hara
(74) *Attorney, Agent, or Firm* — Sughrue Mion, PLLC (57) ABSTRACT

A space probing apparatus is provided that can further enhance its thermal protective function for electronic apparatuses and batteries that are apparatuses each having a narrow range of permissible temperature.
The space probing apparatus includes, as a vehicle body 1 that is an apparatus body, an inner housing 13 that accommodates an electronic apparatus 11 and a battery 12, and an outer housing 15 that accommodates the inner housing 13 supporting the inner housing 13 afloat therein. A thermal insulating layer 16 is formed between the inner housing 13 and the outer housing 15 using a space therebetween. A heat dissipating body 17 is included in an upper portion of the inner housing 13. A lid 18 is included in an upper portion of the outer housing 15. The whole outer faces of the inner and the outer housings 13 and 15 are each covered with a thermal insulating material 20. Thereby, in the nighttime, the temperature of the battery 12 is maintained using the least necessary amount of heat generated and, thereby, the electronic apparatus 11 and the battery 12 are protected from an ultralow temperature. In the daytime, the lid 18 is opened and heat is discharged using the heat dissipating body 17 and, thereby, the electronic apparatus 11 and the battery 12 are protected from a high temperature.

13 Claims, 5 Drawing Sheets

SPACE PROBING APPARATUS

CROSS REFERENCE TO RELATED APPLICATIONS

This is a National Stage of International Application No. PCT/JP2009/0065944 filed Sep.11, 2009, claiming priority based on Japanese Patent Application Nos. 2008-279004 filed Oct. 10,2008 and 2009-122011 filed May 20, 2009, the contents of all of which are incorporated herein by reference in their entirety.

TECHNICAL FIELD

The present invention relates to a space probing apparatus that is used in activities to probe the moon and planets.

BACKGROUND ART

A space probing land rover is present as an example of a space probing apparatus. The space probing land rover is a known space probing technique as described in Non-Patent Literature 1 and a Mars rover, etc., are present as the technique that has been implemented.

For example, when this kind of space probing land rover probes the moon for a long time, the space probing land rover executes its probing activity in the daytime using a solar battery and discontinues its probing activity in the nighttime during which the solar battery are not usable. In this case, the environment on the moon is an environment where the temperature of the ground surface varies in a range of −170 to +130° C. in a day-night cycle there (about 28 days). Therefore, measures for protecting apparatuses loaded on the space probing land rover from the thermal environment are indispensable for the space probing land rover.

A measure for protecting the apparatuses loaded thereon from the heat can be widening of the range of the permissible temperature of the apparatuses. However, the range of the permissible temperature differs depending on the apparatus and it is highly difficult to widen the ranges of the permissible temperature of all the apparatuses. Therefore, heat control corresponding to each range of the permissible temperature is necessary, and heat control operations such as discharge of heat in the daytime and thermal insulation in the nighttime that are opposite to each other must be executed especially for apparatuses each having a narrow range of the permissible temperature. Apparatuses each having a wide range of the permissible temperature include a motor. Apparatuses each having a narrow range of the permissible temperature include electronic apparatuses (electronic circuits) to control the apparatuses loaded thereon and batteries.

Therefore, a conventional space probing land rover is present that protects electronic apparatuses and batteries each having a narrow range of the permissible temperature from the ultralow temperature in the nighttime by employing a double-structured vehicle body and accommodating the apparatuses and the batteries in the innermost portion of the rover, and that discharges heat by opening the upper part of the vehicle body in the daytime (see, Patent Document 1).

PRIOR ART DOCUMENTS

Patent Document

Patent Document 1: Japanese Laid-Open Patent Publication No. 2001-106198

Non-Patent Literature

Non-Patent Literature 1: The Japan Society for Aeronautical and Space Sciences, "2nd Edition: Aerospace Engineering Handbook", Maruzen Co., Ltd., Sep. 30, 1992, pp. 830-831

DISCLOSURE OF THE INVENTION

Problem that the Invention is to Solve

However, though the space probing apparatuses including the conventional space probing land rover have been enabled to protect the electronic apparatuses and batteries from the ultralow temperature in the nighttime, room for improvement thereof is still present in the current state and further improvement of the thermal protective function has been demanded.

The present invention was conceived in view of the above circumstances and the object thereof is to provide a space probing apparatus that can especially further enhance its thermal protective function for electronic apparatuses and batteries each having a narrow range of the permissible temperature and that can especially protect those apparatuses and batteries from the ultralow temperature in the nighttime using a little energy.

Means to Solve the Problem

The space probing apparatus of the present invention includes, as an apparatus body thereof, an inner housing that accommodates at least electronic apparatuses and batteries of apparatuses loaded thereon, and an outer housing that accommodates the inner housing supporting the inner housing afloat therein using holding ropes and, thereby, forms a thermal insulating layer between the inner housing and the outer housing using a space therebetween. The space probing apparatus is used in probing activities on the moon and planets and, therefore, the state of the space that is the thermal insulating layer is a vacuum or a dilute atmosphere.

The space probing apparatus is configured to: include a heat dissipating body for the electronic apparatuses in the upper portion of the inner housing; include a lid that can be opened and closed in the upper portion of the outer housing; have the whole outer face of the inner housing including the heat dissipating body covered with a thermal insulating material; and have the whole outer face of the outer housing including the lid covered with a thermal insulating material. The space probing apparatus employs this configuration as a means to solve the conventional problem.

Effect of the Invention

According to the space probing apparatus of the present invention, the thermal protective function thereof for electronic apparatuses and batteries that are apparatuses each having a narrow range of the permissible temperature can further be enhanced and these apparatuses can be protected from an ultralow temperature using a little energy (amount of heat generated).

In the nighttime, the space probing apparatus: sets the inner housing and the outer housing to be in their closed states: thereby, reduces as small as possible the amount of heat radiated; can maintain the temperature of its batteries using the least necessary amount of heat generated; and can protect the electronic apparatuses and the batteries from the ultralow temperature. In the daytime, the space probing apparatus: sets the lid of the outer housing to be in its open state; discharges heat using the heat dissipating body when necessary; and, thereby, can protect the electronic apparatuses and the batteries from the high temperature of the ground surface.

MODES FOR CARRYING OUT THE INVENTION

FIGS. 1 to 4 are diagrams for explaining an embodiment of a space probing apparatus of the present invention. The space probing apparatus of the embodiment is a space probing land rover that is used in probing the surface of the moon, and is applied with a measure taken for thermal protection taking into consideration the surface temperature of the moon (about −170 to +130° C.).

Figure 1:
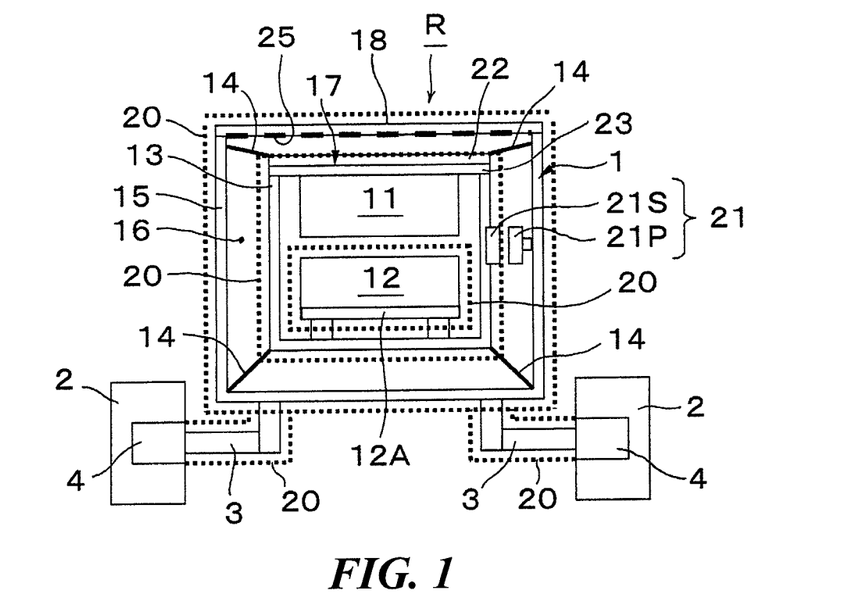
FIG. 1 is a cross-sectional diagram for explaining an activity discontinued state in the nighttime of a space probing land rover that is a space probing apparatus in an embodiment of the space probing apparatus of the present invention.
Figure 2:
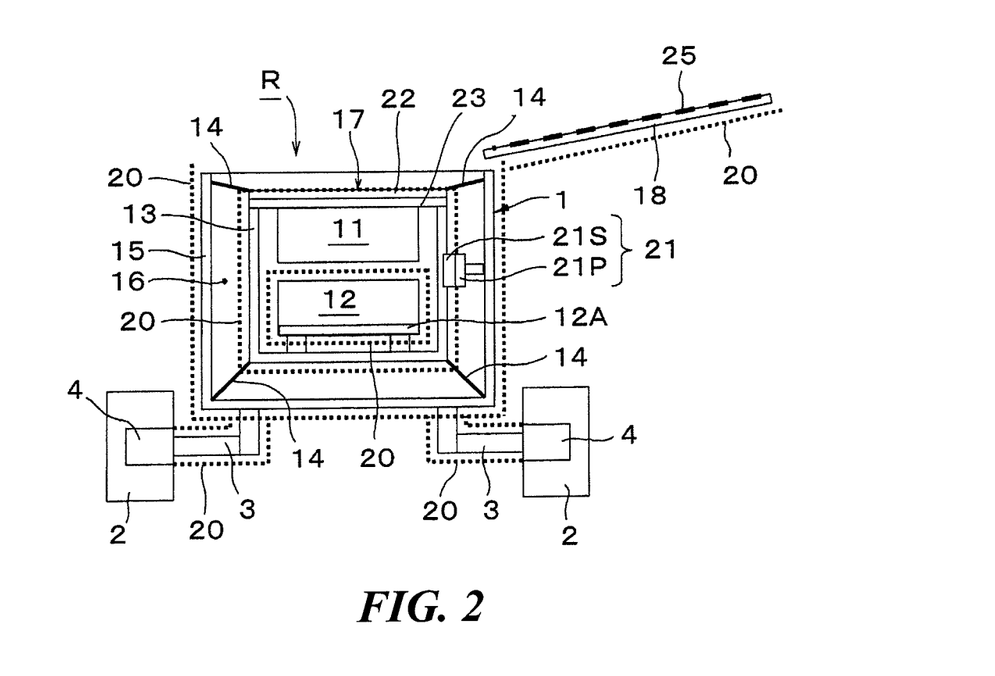
FIG. 2 is a cross-sectional diagram for explaining an activity conducting state in the daytime of the space probing land rover depicted in FIG. 1.
Figure 3:
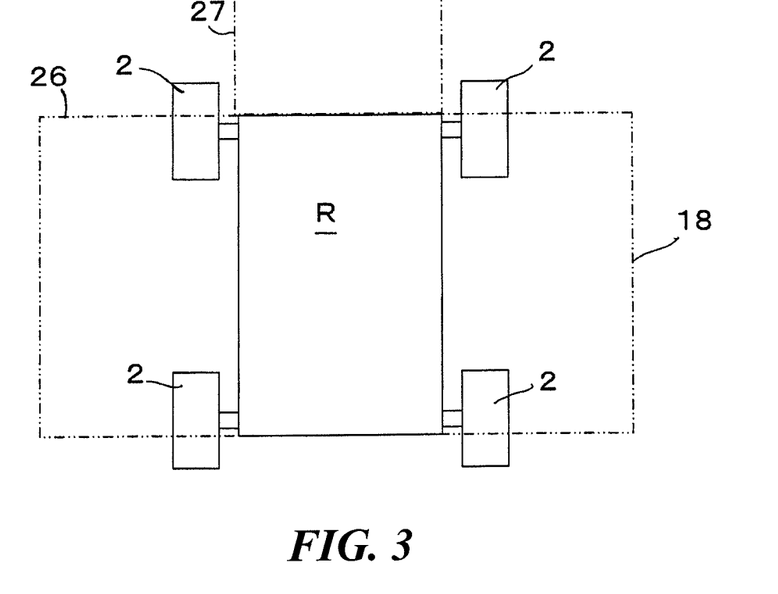
FIG. 3 is a plan view for explaining the space probing land rover depicted in FIG. 1.

The space probing land rover R depicted includes four driving wheels 2 for running at the front and the back on the left and the right of a vehicle body 1. Each of the driving wheels 2 for running is joined to the vehicle body 1 through a suspending apparatus 3 and has an individual driving source (motor) 4. Thereby, the space probing land rover R can run forward or backward by rotating the driving wheels 2 for running in the same direction, and can turn by rotating the driving wheels 2 for running on one side on the left or the right or by rotating the driving wheels 2 for running on the left and those on the right each in a reverse direction against each other.

The space probing land rover R includes, as a vehicle body (apparatus body) 1, an inner housing 13 that accommodates at least an electronic apparatus 11 and a battery 12 of apparatuses loaded thereon and an outer housing 15 that accommodates the inner housing 13 supporting the inner housing 13 afloat therein using holding ropes 14. Thereby, the space probing land rover R forms a thermal insulating layer 16 in the whole space between the inner housing 13 and the outer housing 15 using the space.

The space probing land rover R includes a heat dissipating body 17 for the electronic apparatus 11 in the upper portion of the inner housing 13 and also includes a lid 18 that can be opened and closed in the upper portion of the outer housing 15. The whole outer face of the inner housing 13 including the heat dissipating body 17 is covered with a thermal insulating material 20 and the whole outer face of the outer housing 15 including the lid 18 is covered with the thermal insulating material 20.

The electronic apparatus 11 controls various apparatuses loaded on the space probing land rover R and is configured mainly by electronic circuits. The battery 12 is a power source for the various apparatuses loaded thereon and includes a heater 12A for maintaining a temperature in the nighttime. For example, a lithium ion battery can be used for the battery 12.

A cuboid-shaped housing is exemplified for each of the inner housing 13 and the outer housing 15 in FIGS. 1 and 2. However, their shapes are not especially limited. Taking into consideration that the amount of heat radiated is reduced as small as possible, preferably, their surface areas are small and, more preferably, each of their shapes is a shape that includes many curved surface portions such as a cylindrical shape or a spherical shape. The materials of the inner housing 13 and the outer housing 15 are not especially limited. However, more preferably, the material has a durability and a heat resistance for a desired operation.

The holding ropes 14 block the thermal conduction as much as possible between the inner and the outer housings 13 and 15. The holding ropes 14 couple at proper positions the inner and the outer housings 13 and 15 to each other and are each put in a tense state, and, thereby, holds the inner housing 13 afloat at a predetermined position. For the holding ropes 14, Kevlar (registered trademark) from Du Pont de Nemours & Co., etc., can be used as its material that has a low thermal conductivity, in addition, that is light, and that has sufficient strength.

The inner housing 13 accommodates especially apparatuses each having a narrow range of the permissible temperature of the various apparatuses loaded, and accommodates the electronic apparatus 11 and the battery 12 as typical apparatuses each having a narrow range of the permissible temperature. Therefore, the inner housing 13 may accommodate apparatuses other than the electronic apparatus 11 and the battery 12.

The outer housing 15 is a little larger than the inner housing 13 and forms the appearance of the vehicle body 1. A connector 21 that connects and disconnects communication and energizing is provided between the inner housing 13 and the outer housing 15. The connector 21 exemplified in FIGS. 1 and 2 includes a socket 21S on the side of the inner housing 13 and a plug 21P on the side of the outer housing 15. The connector 21 attaches and detaches the socket 21S and the plug 21P to/from each other using a driving means not depicted and, thereby, connects and disconnects the communication and the energizing between the electronic apparatus 11 and the battery 12, and the apparatuses loaded on the side of the outer housing 15.

Figure 4:
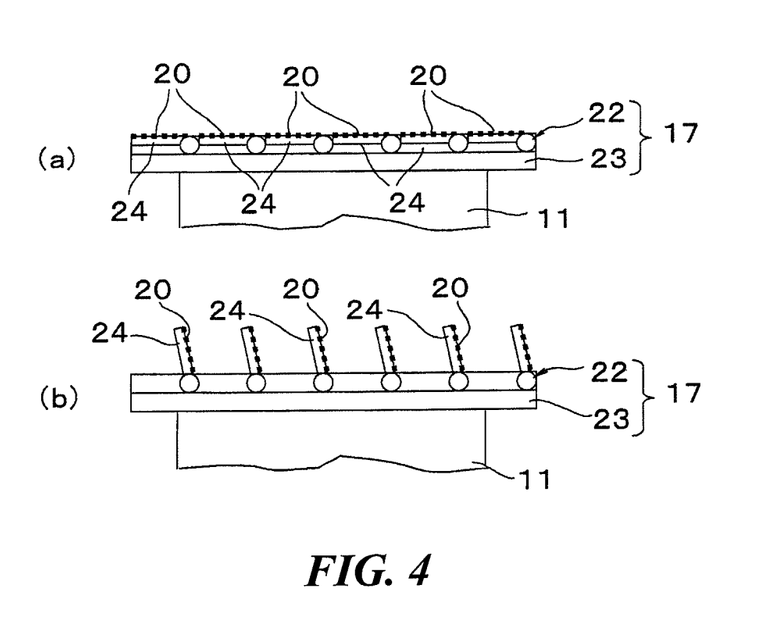
FIG. 4 are a cross-sectional diagram for explaining the state where a thermal louver is closed in a heat dissipating body (a) and a cross-sectional diagram for explaining the state where the thermal louver is opened (b).

As depicted also in FIG. 4, the heat dissipating body 17 includes a thermal louver 22 at an upper position therein and a radiator 23 at a lower position therein, and further enhances a heat dissipating property of the electronic apparatus 11 by attaching the electronic apparatus 11 directly to the undersurface of the radiator 23.

The thermal louver 22 is formed by a plurality of rotatable blades 24 that are arranged in a plane, opens or closes the blades 24 corresponding to the temperatures of the electronic apparatus 11 and the inner housing 13, varies the area of openings, and, thereby, controls the amount of heat dissipated. In this case, all the blades 24 can simultaneously be rotated or only the selected blades 24 can be rotated.

A thermal louver that can be automatically controlled as so-called active controlling elements can be employed as the thermal louver 22. In this case, the thermal louver includes a bimetal that plays the roles of a sensor and an actuator, and many blades 24 each having an optical surface. Expansion and contraction of the bimetal caused by the heat conduction and the radiation causes a rotary force on a shaft of each of the blades corresponding to the variation of the temperature of the electronic apparatus 11 and, thereby, the blades 24 are automatically opened or closed.

In addition to the configuration including the thermal louver 22 and the radiator 23, the heat dissipating body 17 may be configured to include a heat sink and a heat pipe to absorb the heat of the electronic apparatus 11 and cause the heat to escape to the side of the thermal louver 22.

The lid 18 is rotatably joined to one side of the outer housing 15 that is the vehicle body 1 and is opened and closed by an actuator not depicted. The lid 18 includes solar battery panels 25 that are functional parts on a face thereof that faces downward when the lid is closed. As depicted in FIG. 3 by virtual lines, rotating boards 26 and 27 can rotatably be provided on the opposite side of the lid 18 or a rear side of the vehicle body, and the undersurfaces of the rotating boards (undersurfaces in their closed states) can be provided with functional parts such as solar battery panels and an antenna. In this case, the rotating boards 26 and 27 are accommodated under the lid 18 in the outer housing 15.

The thermal insulating material 20 is a film-like member that has a low heat dissipating property, and is provided over the whole outer face of each of the inner and the outer housings 13 and 15. Especially, the thermal insulating material 20 is provided on the top surface of each of the blades 24 of the thermal louver 22 that configures the heat dissipating body 17 in the upper portion of the inner housing 13, and is provided on the top surface of the lid 18 in the upper portion of the outer housing 15. MLI (Multi-Layer Insulation) that is known in the field of space ship, etc., can be used for the thermal insulating material 20.

In the embodiment, in the inner housing 13, the whole outer face of the battery 12 is covered with the thermal insulating material 20 and the whole outer face of the suspending apparatus 3 of each of the driving wheels 2 for running is also covered with the thermal insulating material 20.

In the embodiment, members such as an arm that constitutes the suspending apparatus 3 are formed of a thermal insulating material. For example, FRP can be used as this thermal insulating material.

In addition to the above configuration, the space probing land rover R includes as the apparatuses loaded thereon a sensor for recognizing the environment, a communicating apparatus, a measuring apparatus, and an actuator to drive the various apparatuses. External apparatuses of these apparatuses loaded thereon are all accommodated in the outer housing 15 and are externally deployed after the lid 18 is opened when the probing activity is conducted.

As depicted in FIGS. 1 and 4(a), in the nighttime, the space probing land rover R that includes the above configuration: closes the thermal louver 22 of the heat dissipating body 17 in the inner housing 13; accommodates the external apparatuses not depicted in the outer housing 15; closes the lid 18; separates the connector 21; thereby, discontinues all the probing activities; and operates only the heater 12A of the battery 12.

At this time, the space probing land rover R: has the inner housing 13 covered with the thermal insulating material 20; has the outer housing 15 that accommodates the inner housing 13, covered with the thermal insulating material 20; and has the thermal insulating layer 16 formed using the space (that is a vacuum on the moon) between the inner housing 13 and the outer housing 15. Therefore, the amount of heat radiated from the electronic apparatus 11 and the battery 12 to the inner housing 13, the amount of heat radiated from the inner housing 13 to the outer housing 15, and the amount of heat radiated from the outer housing 15 to the external space are all small and, in addition, the amount of heat radiated is reduced stepwise from the interior toward the exterior. Therefore, as a whole, the amount of heat radiated from the vehicle body 1 to the external space is extremely small.

Thereby, the space probing land rover R can reduce an amount of IR rays radiated therefrom as low as possible, maintain the temperature of the battery 12 with the least necessary amount of heat generated, and, thereby, protect the electronic apparatus 11 and the battery 12 from the ultralow temperature (−170° C.) in the nighttime. As to the battery 12, the temperature thereof can be maintained at, for example, about −20° C. The heater 12A of the battery 12 only has to be a heater that generates the amount of heat with which the above temperature can be maintained.

It has been experimentally assured that the driving source (motor) 4 of the driving wheel 2 for running, etc., each have a wide range of the permissible temperature and each can endure an ultralow temperature. Therefore, a contribution can be made to energy saving by configuring such parts not to be thermally protected.

The space probing land rover R: blocks the heat conduction through the connector 21 by separating the connector 21; further reduces the amount of heat radiated from the innermost portion thereof to the external space by covering even the battery 12 with the thermal insulating material 20; and reduces the amount of heat conducted from the vehicle body 1 to the ground surface and the amount of heat radiated from the suspending apparatuses 3 by forming the suspending apparatuses 3 of the driving wheels 2 for running using the thermal insulating material and covering the suspending apparatuses 3 with the thermal insulating material 20. The protective function against the ultralow temperature in the nighttime can further be enhanced also with these configurations.

As depicted in FIG. 2, in the daytime, the space probing land rover R: opens the lid 18 of the outer housing 15; thereby, sets the solar battery panels 25 in their deployed state; deploys the external apparatuses not depicted; connects the connector 21; and starts its probing activity.

At this time, the space probing land rover R closes the thermal louver 22 of the heat dissipating body 17 and, thereby, protects the electronic apparatuses 11 and the battery 12 from the high temperature (130° C.) of the ground surface in the daytime.

The suspending apparatuses 3 of the driving wheels 2 for running are formed from the thermal insulating material and, thereby, the thermal protective function is also enhanced further by reducing the thermal conduction from the ground surface to the vehicle body 1.

The space probing land rover R opens the thermal louver 22 of the heat dissipating body 17 as depicted in FIG. 4(b) based on the temperature, etc., of the electronic apparatus 11 and the battery 12 and, thereby, discharges the heat from the inside of the inner housing 13. Thereby, the space probing land rover R prevents in advance overheating of the inside of the inner housing 13 and, thereby, protects the electronic apparatus 11 and the battery 12 from the high temperature in the daytime.

When the space probing land rover R runs and goes into the shade, the temperature environment suddenly varies (temperature drop). However, the state where the lid 18 is opened and the external apparatuses are deployed must be maintained to continue the probing activity. At this time, the space probing land rover R can suppress the thermal radiation from the inner housing 13 by closing the thermal louver 22 of the heat dissipating body 17, and can protect the electronic apparatus 11 and the battery 12 from the low temperature.

In this manner, the space probing land rover R can significantly enhance the thermal protective function for the electronic apparatus 11 and the battery 12 that each have a narrow range of permissible temperature, and simultaneously has both of the function of protecting the apparatuses from the ultralow temperature in the nighttime using a little energy (amount of heat generated) and the function of protecting those apparatuses from the high temperature in the daytime.

Figure 5:
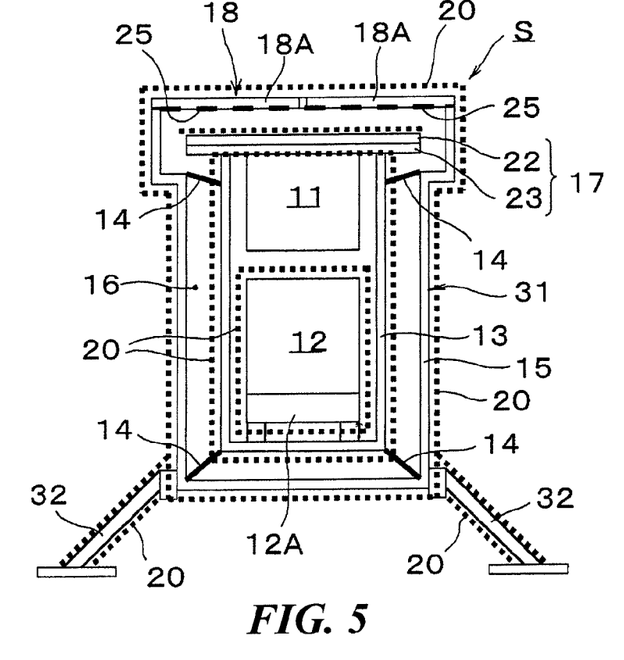
FIG. 5 is a cross-sectional diagram for explaining an activity discontinued state in the nighttime of a space probing apparatus in another embodiment of the space probing apparatus of the present invention.
Figure 6:
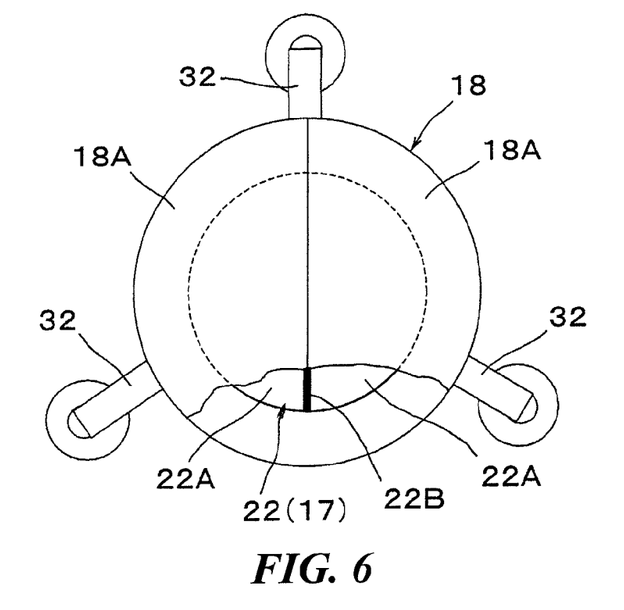
FIG. 6 is a plan view for explaining the space probing apparatus depicted in FIG. 5.
Figure 7:
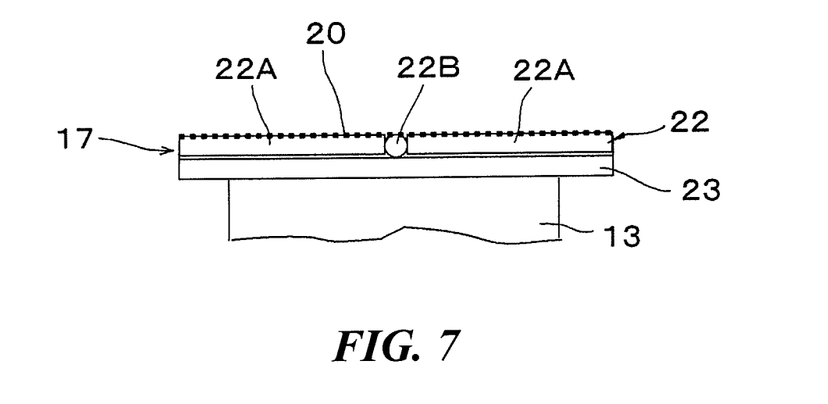
FIG. 7 is a side view for explaining a heat dissipating body of the space probing apparatus depicted in FIG. 5.

FIGS. 5 to 7 are diagrams for explaining another embodiment of the space probing apparatus of the present invention. Same components as those in the previous embodiment are given the same reference numerals and will not again be described.

A space probing apparatus S depicted in FIGS. 5 and 6 is an apparatus that is, for example, conveyed from a landing module not depicted and is installed on the ground surface using a proper means, and includes three supporting legs 32 in the lower portion of an apparatus body 31. The supporting legs 32 are joined to the apparatus body 31 through hinges to be folded when the apparatus S is accommodated and automatically deploy when the apparatus S is installed.

The space probing apparatus S of this embodiment includes as an apparatus body 31: a cylindrical inner housing 13 that accommodates at least the electronic apparatus 11, the battery 12, and the heater 12A for maintaining the temperature for the battery 12 of the apparatuses loaded thereon; and a substantially cylindrical outer housing 15 that accommodates the inner housing 13 supporting the inner housing 13 afloat therein using the holding ropes 14. Thereby, the space probing apparatus S forms the thermal insulating layer 16 in the whole space between the inner housing 13 and the outer housing 15 using the space.

The space probing apparatus S includes: in the upper part of the inner housing 13, the heat dissipating body 17 that includes the thermal louver 22 at an upper position therein and the radiator 23 at an lower position therein; and the lid 18 that can be opened and closed in the upper part of the outer housing 15. The whole outer face of the inner housing 13 is covered with the thermal insulating material 20 and the whole outer face of the outer housing 15 including the lid 18 is covered with the thermal insulating material 20. The space probing apparatus S further has the whole outer face of the battery 12 covered with the thermal insulating material 20, has the whole outer face of each of the supporting legs 32 covered with the thermal insulating material 20, and has each of the supporting legs 32 formed from a thermal insulating material such as FRP.

The lid 18 of the embodiment includes two divided boards 18A and 18A each having a semicircular shape, that form a circular shape as a whole. The center of the arc of each of the divided boards 18A and 18A is joined to an opening of the outer housing 15 through a hinge (see FIG. 8) 18B.

The lid 18 includes the solar battery panels 25 that are functional parts on the face thereof that faces downward when the lid is closed, and is configured to have the whole outer face of each of the divided boards 18A and 18A covered with the thermal insulating material 20. The space probing apparatus S can accommodate the various apparatuses such as the actuator to drive the lid 18, the antenna for communication, and a CCD camera between the lid 18 that is closed and the heat dissipating body 17.

The thermal louver 22 at the upper position of and constituting the heat dissipating body 17 includes two blades 22A and 22A each having a semicircular shape. The blades 22A and 22A are rotatably joined to each other by a rotating shaft 22B that is disposed along a chord (on the central line of the thermal louver), and are also rotatably joined to a frame not depicted by the rotating shaft 22B. The thermal louver 22 includes the thermal insulating material 20 that integrally covers the whole outer face of the blades 22A and 22A.

As depicted in FIGS. 5 and 6, in the nighttime, the space probing apparatus S that includes the above configuration: closes the lid 18; discontinues all the probing activities; operates only the heater 12A of the battery 12; and, thereby, similarly to the previous embodiment, can reduce the amount of IR rays radiated therefrom as low as possible; maintain the temperature of the battery 12 with the least necessary amount of heat generated; and, thereby, protect the electronic apparatus 11 and the battery 12 from the ultralow temperature in the nighttime.

Figure 8:
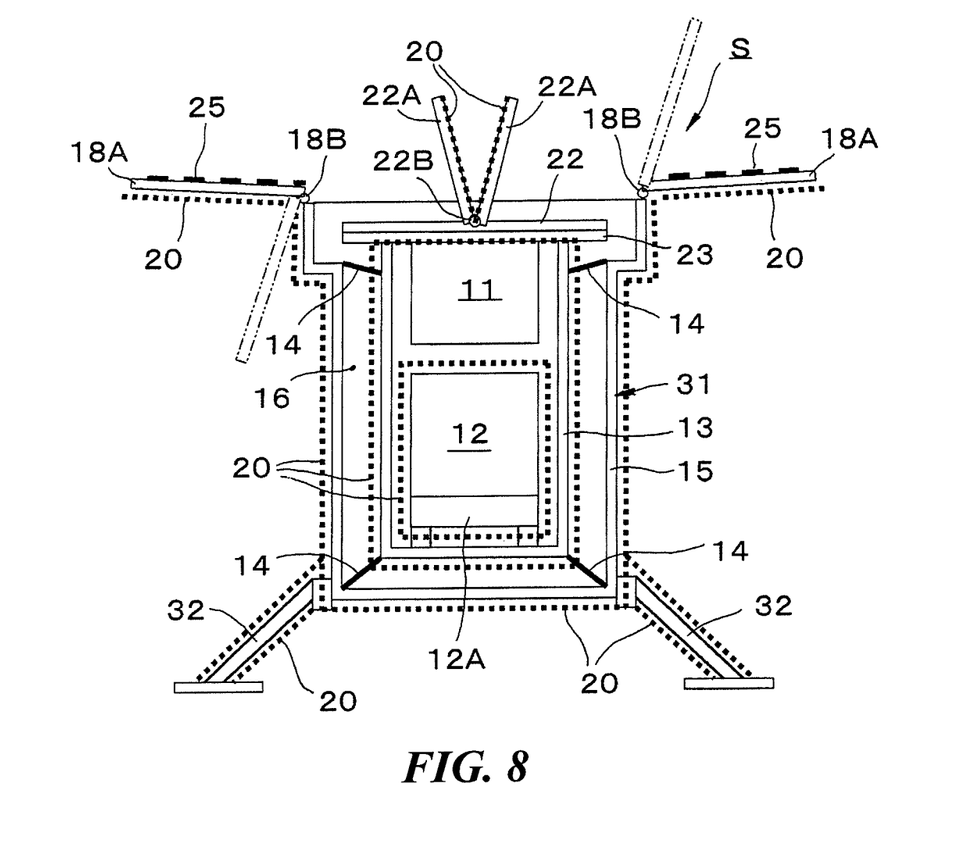
FIG. 8 is a cross-sectional diagram for explaining an activity conducting state in the daytime of the space probing apparatus depicted in FIG. 5.

As depicted in FIG. 8, in the daytime, the space probing apparatus S: opens the lid 18; sets the solar battery panels 25 in their deployed state; starts its probing activity; and, similarly to the previous embodiment, discharges the heat of its inside using the heat dissipating body 17. At this time, the space probing apparatus S varies the amount of rotation of the blade 22A of the thermal louver 22, thereby, controls the amount of the heat radiated from the inside, prevents in advance overheating of the inside of the inner housing 13 and, thereby, protects the electronic apparatus 11 and the battery 12 from the high temperature in the daytime.

The space probing apparatus S of the embodiment enhances its thermal protective function by reducing the heat conduction from the ground surface to the apparatus body 31 also by covering the supporting legs 32 with the thermal insulating material 20 and forming the supporting legs 32 from the other thermal insulating material.

The space probing apparatus S of the embodiment is configured to include the thermal louver 22 in the heat dissipating body 17 that includes the two blades 22A rotatably joined to each other and the thermal insulating material 20 that integrally covers the whole outer face of the blades 22A, and, thereby, can excellently maintain the thermal insulating function of the thermal insulating material 20 in the thermal louver 22.

The reason is as follows. As above, the thermal insulating material 20 used in the apparatus is MLI (Multi-Layer Insulation), etc., and, for example, when the thermal insulating material 20 is cut matching the shape of the member to be covered therewith, a fixation portion may be provided that is a so-called seam. However, when such a fixation portion is provided, the heat conduction from the front surface to the back surface tends to be generated in this portion and the thermal insulating function is degraded by the degree corresponding to the heat conduction.

Whereas, in the space probing apparatus S, to provide the fixation portion (seam) is only a little necessary for the thermal insulating material 20 on the outer side of the thermal louver 22 and, therefore, the degradation of the thermal insulating function due to the fixation portion is also only a little. Therefore, the thermal insulating function of the thermal insulating material 20 can excellently be maintained.

The space probing apparatus S can be configured to have the divided boards 18A and 18A of the lid 18 rotatable in a range exceeding 180 degrees and, more preferably, in a range close to 270 degrees. With this configuration, all the solar battery panels 25 can be caused to face upward matching the direction to the sun or can be caused to horizontally face as depicted in FIG. 8 by virtual lines and, therefore, highly efficient power generation is enabled.

Though not depicted, when the upper opening of the outer housing 15 is configured to be provided with a ring that is driven to rotate and the divided boards 18A and 18A are joined to the ring through hinges, the attitude control of the solar battery panels 25 for the direction to the sun can more accurately be conducted.

Figure 9:
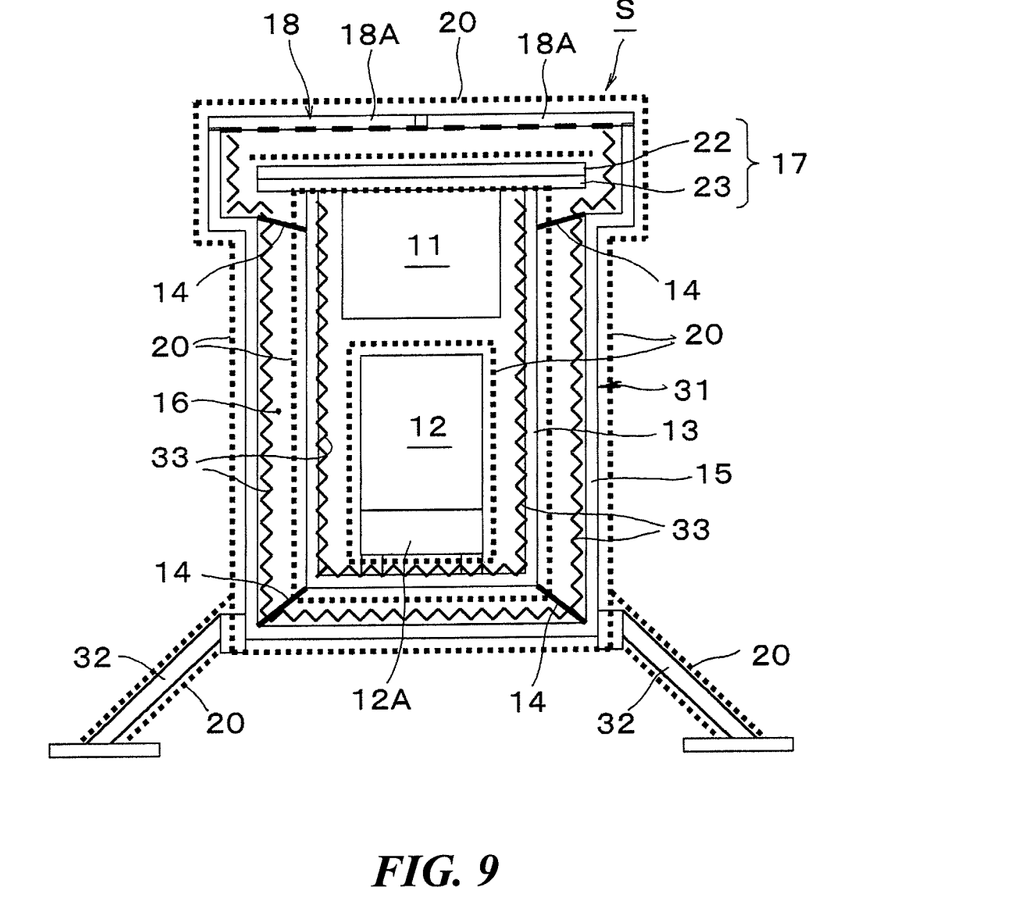
FIG. 9 is a cross-sectional diagram of yet another embodiment of a lid of the space probing apparatus.

FIG. 9 is a diagram for explaining yet another embodiment of the space probing apparatus of the present invention. Same components as those in the previous embodiments are given the same reference numerals and will not again be described.

The space probing apparatus S has the basic configuration that is similar to that of the previous embodiments depicted in FIGS. 5 to 8, and includes a radiated heat control layer that has a low heat radiating property, on at least one of the inner face of the inner housing 13, the inner face of the outer housing 15, and the thermal insulating layer 16 by the space therebetween. In the example depicted, radiated heat control layers 33 and 33 are provided over the whole inner faces of the inner housing 13 and the outer housing 15. The above MLI, a coated film made of a paint, a mirror finished surface, etc., can be used for each of the radiated heat control layers 33.

For example, CFRP is used for the inner housing 13 and the outer housing 15. However, in this case, the heat radiated from the battery 12 and the inner housing 13 is absorbed by the inner faces of the inner housing 13 and the outer housing 15 and, thereby, a change may be made to the thermal insulating function.

Therefore, in the embodiment, this absorption of the heat is prevented by providing the radiated heat control layers 33 and 33 each having a very low thermal emissivity over the whole inner faces of the inner housing 13 and the outer housing 15 and, thereby, the total thermal insulating function can be maintained at a high level. The radiated heat control layers 33 can freely and precisely control the thermal emissivity of the inner faces of the housings when the conditions are selected such as the positions to provide, the material of, the thickness of, and the area of the layers 33. Therefore, the degree of freedom of the design can be increased and, therefore, the layers 33 are highly effective in acquiring a desired thermal insulating function.

The space probing apparatus S of the embodiment depicted in FIGS. 5 to 9 may itself be an apparatus for stationary observation or is applicable to various apparatuses such as an apparatus to supply electric power, etc., to other apparatuses, and an apparatus acting as a relaying base to transmit to the Earth data acquired by the other apparatuses. The space probing apparatus S of the embodiment depicted in FIGS. 5 to 9 can also employ the connector (reference numeral "21") of the space probing land rover of the embodiment depicted in FIG. 1.

The configuration of the space probing apparatus according to the present invention is not limited to those of the above embodiments, and changes can be properly made to the shapes, the materials, etc., of its components within the scope not departing from the purview of the present invention. For example, though the double-structured apparatus body (vehicle body) including the inner housing and the outer housing is described in the embodiments, the size and the shape of each of the housings can also be changed or the vehicle body can also be modified to a more-multiple-layered structure, corresponding to the range of the permissible temperature of the apparatus to be protected and the environmental temperature for the operation thereof.

The thermal insulating material may be a metal film that is formed by vapor deposition, etc., as a material having a low heat radiating property in addition to MLI described in the embodiments. Such a metal film can be formed on the surface of each thermal insulating member or can be directly formed on the outer surface of the housings.

The connector configured by the socket and the plug that are detachable from each other are exemplified in the embodiments. However, in addition to those that directly execute communication and energizing, a connector can be used that connects and disconnects communication and energizing in a non-contact manner such as communication by optical signals and power supply by electromagnetic induction.

EXPLANATIONS OF LETTERS OR NUMERALS

R space probing land rover (space probing apparatus)
S space probing apparatus
1 vehicle body (apparatus body)
2 driving wheel for running
3 suspending apparatus
11 electronic apparatus
12 battery
13 inner housing
14 holding rope
15 outer housing
16 thermal insulating layer
17 heat dissipating body
18 lid
20 thermal insulating material
21 connector
22 thermal louver
22A blade
25 solar battery panel
31 apparatus body
32 supporting leg
33 radiated heat control layer

The invention claimed is:

1. A space probing apparatus comprising:
an inner housing comprising outer faces including a top face and a bottom face and an outer housing comprising outer faces, the inner and outer housings forming an apparatus body, the inner housing accommodating at least one electronic apparatus and a battery of the at least one electronic apparatus loaded on the space probing apparatus, the outer housing accommodating the inner housing supporting the inner housing afloat therein using holding ropes, the inner housing and the outer housing forming a thermal insulating layer therebetween using a space present therebetween;
a heat dissipating body of the at least one electronic apparatus in an upper portion of the inner housing; and
a lid that is capable of being opened and closed in an upper portion of the outer housing,
wherein each of the outer faces of the inner housing including the heat dissipating body is fixedly covered with a thermal insulating material irrespective of the lid being opened or closed, and
wherein each of the outer faces of the outer housing including the lid is covered with a thermal insulating material.

2. The space probing apparatus of claim 1, wherein the battery comprises outer faces and each of the outer face of the battery is covered with a thermal insulating material in the inner housing.

3. The space probing apparatus of claim 1, further comprising a plurality of driving wheels for running that each have an individual driving source, the driving wheels each being attached to the apparatus body through a suspending apparatus, wherein the suspending apparatus comprises outer faces and each of the outer faces of the suspending apparatus is covered with a thermal insulating material.

4. The space probing apparatus of claim 1, further comprising a plurality of driving wheels for running that each have an individual driving source, the driving wheels each being attached to the apparatus body through a suspending apparatus, wherein the suspending apparatus is formed of a thermal insulating material.

5. The space probing apparatus of claim 1, further comprising a plurality of supporting legs comprising outer faces and configured to support the apparatus body, wherein each of the outer faces of each of the supporting legs is covered with a thermal insulating material.

6. The space probing apparatus of claim 1, further comprising a plurality of supporting legs that support the apparatus body, wherein each of the supporting legs is formed of a thermal insulating material.

7. The space probing apparatus of claim 1, further comprising a connector configured to connect and disconnect communication and configured to provide energizing between the inner housing and the outer housing.

8. The space probing apparatus of claim 1, wherein the lid is rotatably provided for the apparatus body and comprises functional parts including solar battery panels and an antenna on the face thereof that faces downward when the lid is closed.

9. The space probing apparatus of claim 1, wherein the heat dissipating body comprises a thermal louver, and wherein the thermal louver comprises a pair of blades that are rotatably joined to each other and a thermal insulating material that integrally covers a each of outer face of the blades.

10. The space probing apparatus of claim 1, wherein at least one of an inner face of the inner housing, an inner face of the outer housing, and the thermal insulating layer by the space comprises a radiated heat control layer that has a low thermal emissivity.

11. The space probing apparatus of claim 1, wherein the outer faces of the inner housing further comprise a plurality of side faces provided between the top and bottom faces.

12. The space probing apparatus of claim 11, wherein the at least one electronic apparatus is attached to the top face of the inner housing.

13. The space probing apparatus of claim 1, wherein the top and bottom faces are spaced apart from each other in a gravity direction.

* * * * *